Aug. 28, 1928.  
W. G. JENSEN ET AL  
1,682,617  
SAFETY HOOK  
Filed Oct. 17, 1927

INVENTORS  
W. G. Jensen  
K. R. Jensen  
BY  
ATTORNEY

Patented Aug. 28, 1928.

1,682,617

UNITED STATES PATENT OFFICE.

WILLIAM G. JENSEN AND KRESTEN R. JENSEN, OF NOWATA, OKLAHOMA.

SAFETY HOOK.

Application filed October 17, 1927. Serial No. 226,796.

This invention relates to safety hooks and more particularly to hooks of this character used to pull rods and tubing on oil wells, mines or any hoisting machinery.

A primary object of the invention is to provide a hook of this character which has a positive latch which closes by gravity and prevents all danger of the hook being caught in the derrick or other objects which it may pass.

Another object is to so construct the latch member that it may be readily operated by the hand which grasps the hook without any extra effort.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1:
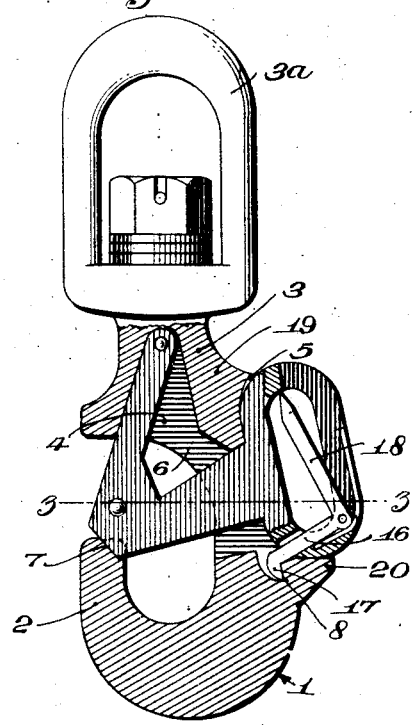
Figure 1 represents a side elevation partly in section of a hook constructed in accordance with this invention, with the latch shown closed.

In the embodiment illustrative the hook 1 embodying this invention is equipped with the usual bill 2 and shank 3 on the end of which shank is mounted an attaching loop or swivel 3ª. The body portion of the hook has a recess 4 extending throughout the greater portion of the upper part thereof and which opens through the rear edge at 5 for the passage of the operating latch while the front edge thereof is open at 6 for this purpose. At the ends of the opening 5 are stop lugs 19 and 20 for a purpose to be described.

In the lower wall of the recess 4 adjacent the opening 5 is a shoulder 8 with which is designed to be engaged a catch 15 presently to be more fully described.

Figure 2:
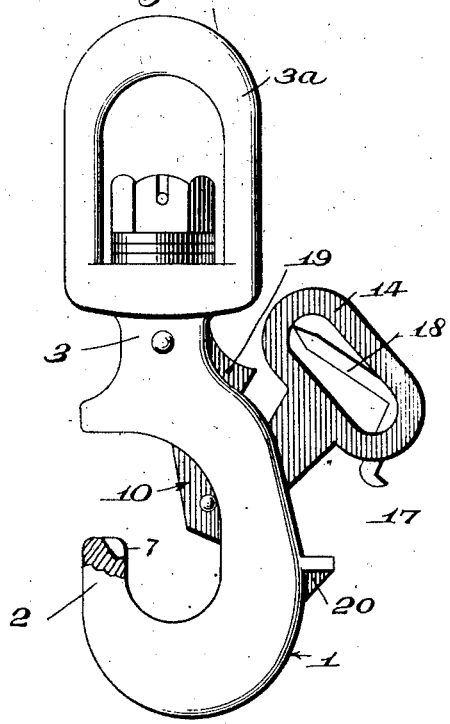
Fig. 2 is a similar view with the latch in open position.
Figure 4:
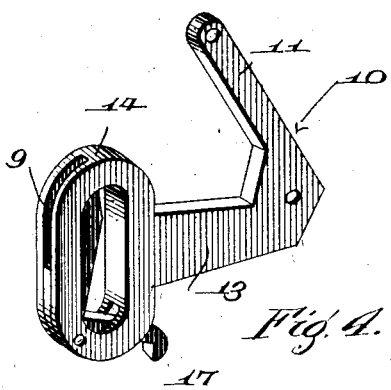
Fig. 4 is a detail perspective view of the latch shown detached.
Figure 3:
Fig. 3 is a transverse section taken on line 3—3 of Fig. 1.

The bill 2 of the hook has a seat 7 formed therein opening inward and which is designed to receive the locking tongue or latch 10 which will now be described. This locking tongue 10 is preferably made substantially L on truncated V-shaped and the arm 11 thereof is pivotally connected at its free end within the recess 4 adjacent the upper portion thereof at the shank 3 of the hook, as is shown clearly in Figs. 1 and 2. This arm 11 is designed to swing in and out through the opening 6 in the recess 4 while the arm 13 of said tongue extends through the opening 5 and is equipped at its free end with a hand grip 14 in which is mounted the catch 15. When the latch 10 is in closed position as shown in Fig. 1 the ends of the loop 14 engage the lugs 19 and 20 and in connection with seat 7 which receives the cut off apex of the latch limits the closing movement of the latch, and ensures its proper seating.

The outer portion of the loop 14 has an opening 9 extending edgewise therethrough and is designed for the mounting therein of the catch 15. This catch 15 is also made substantially L-shaped and the short arm 16 thereof has at its free end a forwardly extending locking nose or catch member 17 which is designed to engage with the shoulder 8 and lock the tongue in closed position, as is shown clearly in Fig. 1, while its long arm 18 moves into and out of the opening 9.

It will thus be seen that when in closed locked position, the handle or long arm 18 of the catch 15 extends longitudinally of and into the opening of the loop 14 so that it will lie in position for engagement by the hand of the operator when the handle is grasped. To release the catch 17, pressure is exerted by the hand on the handle member 18 swinging the catch on its pivot and disengaging its nose from the shoulder 8, which permits the locking tongue 10 to be drawn out into the position shown in Fig. 2.

The arm 13 and the handle 14 of the tongue 10 are of sufficient weight to cause the tongue to normally swing by gravity into closed position, so that when so swung and the catch 15 is engaged with the shoulder 8, all danger of the tongue being accidentally released is prevented.

It will be obvious that while this hook is primarily intended for pulling rods and tubing from oil wells, or mines, and the like, it may be used in any connection or in any hoisting machinery, the gist of the invention residing in the gravity closing tongue which is positively locked in closed position and cannot be accidentally released.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

We claim:—

1. A safety hook having a body member and a shank with a recess therein opening through the inner face of the shank and also having an opening in the outer edge of the body, an L-shaped tongue pivotally connected at one end in said recess and adapted to swing by gravity across the hook and close the space between the bill and the body thereof, and cooperating means carried by the tongue and the hook body for locking the tongue in closed position.

2. A safety hook having a recess in the upper portion of its body and shank opening inwardly through the edge of the shank and outwardly through the body, an L-shaped tongue pivotally mounted at one end within said recess and with its outer end extending through the opening in the rear of the body, said tongue being operable by gravity to swing into closed position between the body and the bill of the hook, and gravity controlled means for locking the tongue releasably in closed position.

3. A safety hook having an aperture extending edgewise through the body thereof, an L-shaped tongue pivotally mounted at one end on the shank of said hook and adapted to swing by gravity to close the space between the bill and the body of the hook, said tongue having a hand grip, and cooperating means carried one by the hand grip and the other by the body for locking the tongue in closed position.

4. A safety hook having an L-shaped tongue pivotally mounted at one end on the shank of the hook and adapted to swing across and close the space between the bill of the hook and the body, the bill having a seat to receive the tongue at the bend thereof and hold it against lateral movement and a gravity catch for locking said tongue in closed position, said tongue having a hand grip with an opening therein to receive the operator's fingers, the handle of said catch extending across said opening to be grasped by the fingers and release the tongue.

KRESTEN R. JENSEN.
WILLIAM G. JENSEN.